United States Patent [19]

Auer

[11] 4,442,723

[45] Apr. 17, 1984

[54] NORTH SEEKING AND COURSE KEEPING GYRO DEVICE

[75] Inventor: Werner Auer, Wiesenbach, Fed. Rep. of Germany

[73] Assignee: Teldix GmbH, Heidelberg, Fed. Rep. of Germany

[21] Appl. No.: 325,186

[22] Filed: Nov. 27, 1981

[30] Foreign Application Priority Data

Dec. 3, 1980 [DE] Fed. Rep. of Germany ....... 3045507

[51] Int. Cl.³ .................... G01C 19/30; G01C 19/38
[52] U.S. Cl. ...................... 74/5.47; 33/318; 33/324; 74/5.41
[58] Field of Search ............ 74/5.41, 5.47, 5.6 R; 33/324, 318, 320, 326

[56] References Cited

U.S. PATENT DOCUMENTS

| | | | |
|---|---|---|---|
| 3,254,419 | 6/1966 | Hurlburt | 33/320 X |
| 3,354,726 | 11/1967 | Krupick et al. | 74/5 |
| 4,158,261 | 6/1979 | Auer | 33/324 |
| 4,321,678 | 3/1982 | Krogmann | 364/453 |
| 4,383,452 | 5/1983 | Imbeninato et al. | 74/5.41 |

FOREIGN PATENT DOCUMENTS 2741274 3/1979 Fed. Rep. of Germany .

Primary Examiner—Rodney H. Bonck
Attorney, Agent, or Firm—Spencer & Frank

[57] ABSTRACT

A gyro device arranged to be mounted in a vehicle and operable selectively as a directional gyro or as a gyro compass, which includes a gyro generating signals relative to two measuring directions, an azimuth gimbal mounted with its pivot axis oriented substantially vertically, a drive unit connected to receive the signal from a first position sensor and for pivoting a precession gimbal supported by the azimuth gimbal about a precession axis into a position in which the gyro spin axis is parallel to the pivot axis of said azimuth gimbal, a second position sensor providing a signal representative of the inclination of the precession axis to the horizontal, and a switching member for effecting pivoting of the precession gimbal about the precession axis to bring the spin axis of the gyro into a horizontal orientation for permitting operation of the device as a directional gyro.

7 Claims, 3 Drawing Figures

NORTH SEEKING AND COURSE KEEPING GYRO DEVICE

BACKGROUND OF THE INVENTION

The present invention relates to a north seeking and course keeping gyro device, of the type including a gyro presenting two measuring axes and having its spin axis oriented essentially vertically, the gyro being supported by a procession gimbal.

Devices of this type further include two position sensors operative to determine the inclination of this gimbal in two directions which are perpendicular to one another and to the gyro spin axis, one of these directions being parallel to the gimbal precession axis. The gyro device additionally includes a further gimbal, in which the precession gimbal is mounted and which itself is mounted in a housing via an axis which is perpendicular to the precession axis. A moment generator, which acts on the axis of the further gimbal, is actuated by a first position sensor and includes a computer circuit for calculating the north deviation $\alpha$ with respect to a reference direction from the signals generated by means of the gyro.

German Auslegeschrift [Published Application] No. 2,741,274 discloses such a gyro device. This is a dual-axis gyro with essentially horizontally disposed input axes, the position sensors of the axes acting in a criss-cross manner on torque generators disposed on both axes. The voltages applied to the torque generators are simultaneously transmitted to a north deviation computer to calculate the north deviation.

In this arrangement it is necessary to set both input axes to the horizontal orientation before the start of the north determination process.

The same prior art also discloses a gyro device which can, in addition to effecting the north determination, be used to determine a course, i.e. as a gyrocompass. For this purpose, the housing of the gyro is pivoted by 90° about one of the input axes. The spin axis then has an essentially horizontal orientation. The gyro is fixed in this position and measures the angular velocities about the input axes fixed to the vehicle, there additionally being provided accelerometers which sense the position of the vehicle with respect to the horizontal.

This gyro device has a complicated structure for course determination, particularly because of the use of accelerometers which must meet very high accuracy requirements. Moreover, evaluation for the course determination is complicated.

SUMMARY OF THE INVENTION

It is an object of the present invention to provide a gyro device which allows the time for a precise north determination to be shortened and which can be used as a course-position reference. A further object of the invention is to effect an accurate course determination with the simplest possible means.

The above and other objects are achieved, according to the present invention in a gyro device arranged to be mounted in a vehicle and operable selectively as a directional gyro or as a gyro compass, which device includes:

- a gyro component including a rotor rotatable about a spin axis;
- a precession gimbal supporting the gyro rotor via its spin axis and pivotal about a precession axis;
- first and second position sensors mounted for providing respective signals representing the inclination of the precession gimbal relative to the horizontal about each of two mutually perpendicular axes which are both perpendicular to the rotor spin axis, the first sensor providing an inclination representing signal relative to that one of the two axes which is parallel to the precession axis;
- a second gimbal supporting the precession gimbal via its precession axis and pivotal about a pivot axis which is perpendicular to the precession axis;
- a housing supporting the second gimbal via its associated pivot axis;
- first drive means connected for pivoting the second gimbal about its pivot axis in response to signals from one of the position sensors,
- control means connected for calculating the north deviation angle of the device relative to a reference direction in response to signals generated by the gyro component, by the following features:
- the gyro component generates signals relative to two measuring directions;
- the second gimbal is mounted with its pivot axis oriented substantially vertically;
- the device further includes second drive means connected to receive the signal from the first position sensor and for pivoting the precession gimbal about the precession axis into a position in which the gyro rotor spin axis is parallel to the pivot axis of the second gimbal;
- the signal provided by the second position sensor is representative of the inclination of the precession axis to the horizontal; and
- the device further includes switching means for effecting pivoting of the precession gimbal about the precession axis to bring the spin axis of the rotor into a horizontal orientation for permitting operation of the device as a directional gyro.

In order to determine the north direction, the caging circuits of the gyro are closed and furnish two signals corresponding to the moments about the input axes of the gyro. To obtain a simple computation of the north direction, the present invention provides that the precession gimbal is aligned with the horizontal in the direction perpendicular to the precession axis by means of simple verticality sensors. According to one preferred embodiment of the invention, it is then only necessary to measure the inclination angle $\phi$ of the precession axis and include it in the calculation of the north deviation angle, $\alpha$. This angle can be calculated by means of the gyro caging circuit signals $\omega_1$ and $\omega_2$ according to the equation $$\alpha = \alpha_1 + \arctan \frac{\omega_1 \cos\phi}{\omega_2 - \Omega_v \sin\phi}$$

where $\Omega_v$ is the vertical component of the earth's rotation and is stored as a constant in a memory of the computer circuit or is fed in before the measurement, and $\alpha_1$ is the angular deviation of the azimuth gimbal from the reference direction.

In order to obtain a fast evaluation of the results, a microprocessor is provided which, for north seeking as well as for the course determination, stores the signals from the gyros, from the verticality sensors and from the axis position sensors and computes therefrom the north deviation angle or the course angle, respectively, and simultaneously controls the program sequence for the individual measuring phases.

In order to simplify the evaluation of the north deviation angle, $\alpha$, it is possible, for north seeking with the aid of the second position sensor and a moment generator acting on the azimuth axis, to align the precession gimbal with the horizontal also in the direction of the precession axis. Then, a consideration of the inclination angle $\phi$ is not required and the north deviation angle can be calculated from the equation $$\alpha = \alpha_1 + \arctan\frac{\omega_1}{\omega_2}$$

In order to obtain a reference of the north direction with respect to the vehicle, the angle $\alpha_1$ between the vehicle and the position of the azimuth gimbal is considered in the calculation.

Manufacturing tolerances of the cardanic frames and vertically sensors, external influences due to magnetic errors, or the like may lead to drift errors in the north determination which are eliminated to a major extent by measuring the north deviation $\alpha$ in two positions of the azimuth axis which are angularly offset by, in particular, 180°. The results obtained this way can be used for an improved determination of the north deviation angle.

In the gyro according to the invention, a simple verticality sensor brings the precession gimbal into a position in which the spin axis of the gyro is horizontal. By arranging the gimbals in this manner, the gyrocompass is completely decoupled and forms a course-position reference in a physically correct manner.

Since during the north seeking, the vehicle in which the gyro is mounted in most cases has its longitudinal or transverse axes in a position which deviates from the horizontal, it is of advantage, in order to transfer the north deviation angle to the course direction or to the course indicator of the gyro, respectively, to rotate the gyro into a position in which the gimbals are arranged with respect to one another in such a manner that a transfer without cardanic errors is possible. In order to accomplish this, the moment generators generate moments on the axes in dependence on the position sensors and move the gimbals into the required position.

If the spin axis of the gyro rotor is aligned with the horizontal, so that the arrangement corresponds to directional gyro operation, it is possible to additionally make a north determination with the aid of the gyrocompass method. For this purpose, a north entrance signal is obtained from the gyro and the deviation of the precession axis from the horizontal is measured and serves to correct the measured north deviation angle.

The advantage of this method is its low sensitivity to interfering movement which makes possible a north determination, for example, if relatively strong vibrations or movements act on the gyro. The axis of the dynamically tuned gyro, which axis is parallel to the precession axis, can in this case be used for suppression of vibrations.

One embodiment of the invention will now be explained in greater detail with the aid of the drawings.

DESCRIPTION OF THE PREFERRED EMBODIMENTS

Figure 1:
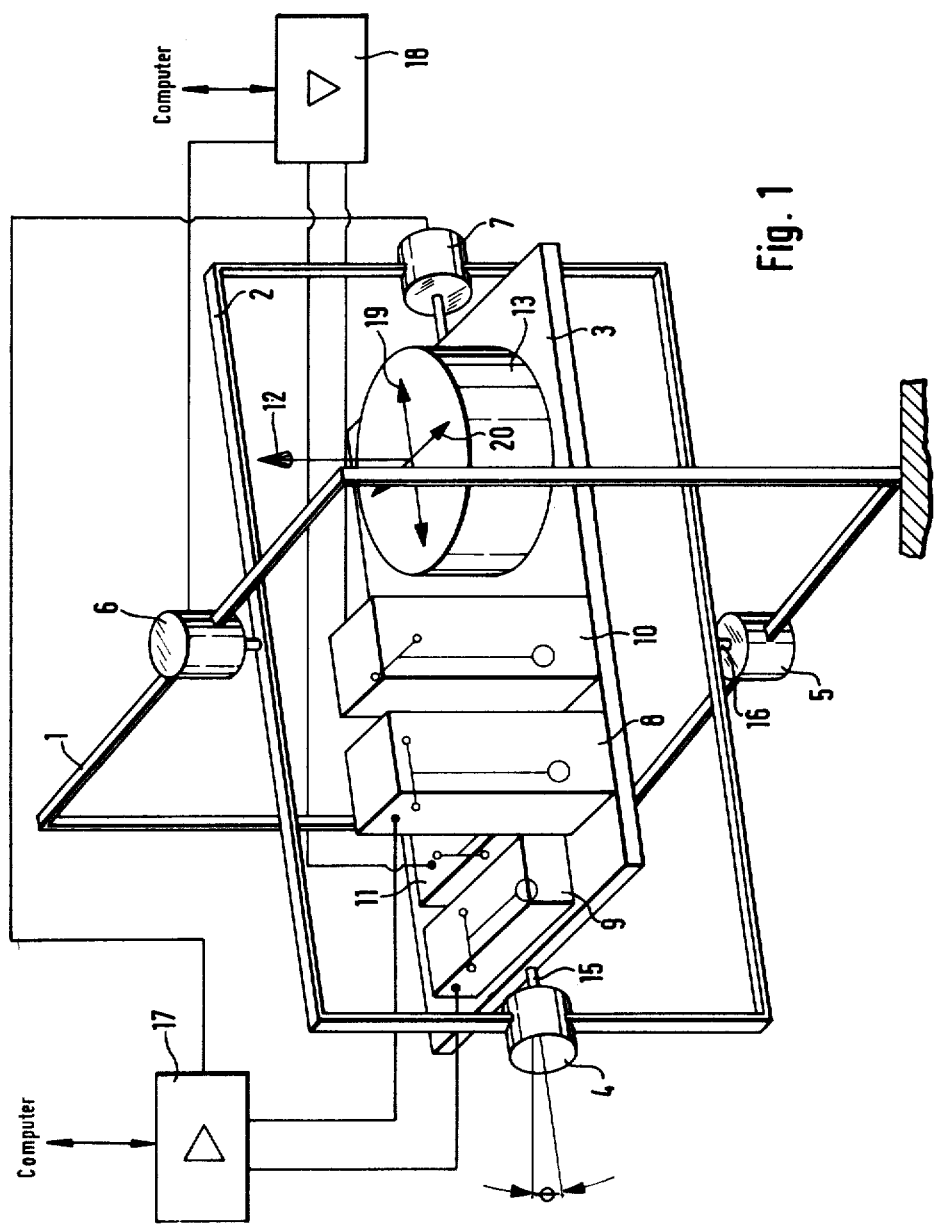
FIG. 1 is a perspective view of a preferred embodiment of a gyro according to the invention in a position suitable for north seeking.

As shown in the Figure, a frame, or housing, 1 is mounted in a stationary member, e.g. a vehicle. An azimuth gimbal 2 is mounted in the frame 1 to be pivotable about a vertically oriented pivot axis 16 and carries a precession gimbal 3 which is mounted to be rotatable about an essentially horizontal axis 15 in the azimuth gimbal 2. The shafts defining axes 15 and 16 are each provided with a rotation angle sensor 4 or 5 and a moment, or torquer, generator 6 or 7.

Two mutually perpendicular position sensors 8 and 9 in the form of verticality sensors as well as two likewise mutually perpendicular position sensors 10 and 11 designed as pitch indicators, or inclinometers, are mounted on the precession gimbal 3 in such a manner that a deviation of the precession gimbal 3 from the horizontal orientation and from a position shifted by 90° with respect to that position can be sensed.

The core of the gyro device, the dynamically tuned gyro 13, is disposed on the precession gimbal 3 in such a manner that the spin axis 12 of gyro 13 is perpendicular to the precession frame. Moreover, the first axis 19 of the dynamically tuned gyro, which axis is oriented in the radial direction, is parallel to the precession axis 15 of the gyro, and the second gyro axis 20 extends at an angle of 90° to axis 19. The signals generated by the verticality sensors 8 and 9 and the pitch sensors 10 and 11 are fed to transmitting unit 17 and 18 which, under the influence of a computer circuit or a microprocessor, conduct signals resulting therefrom to the moment generators 6 and 7.

Figure 2:
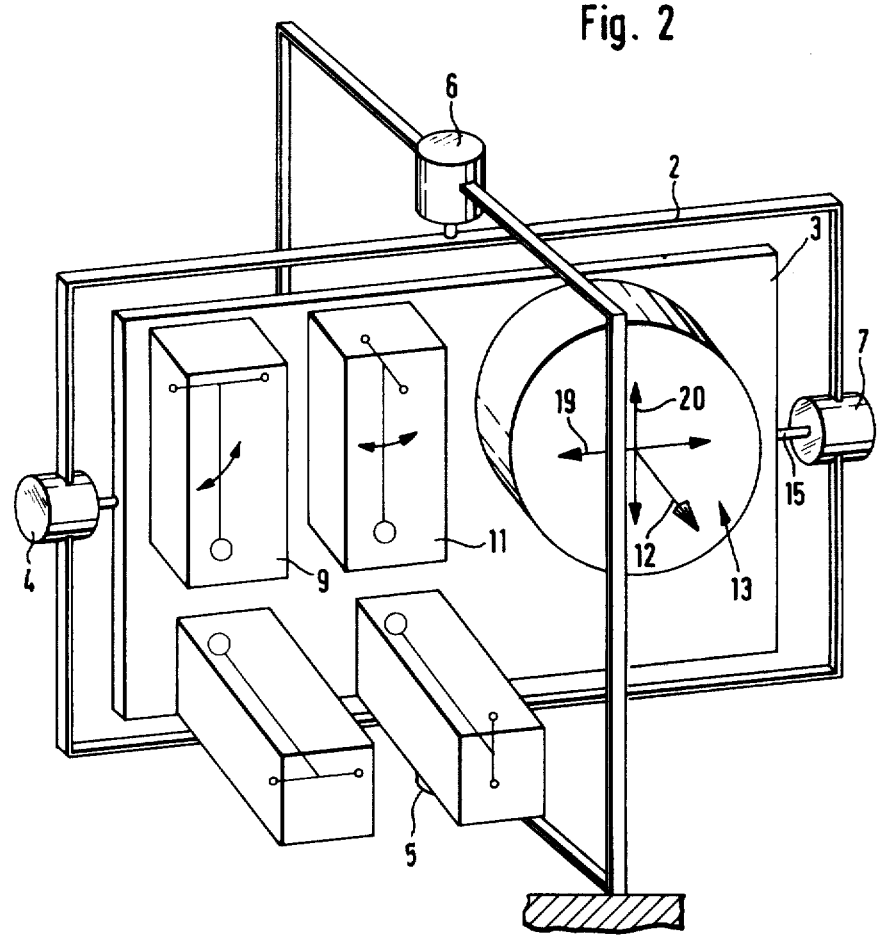
FIG. 2 in a perspective view of a preferred embodiment of a gyro according to the invention in a position suitable for directional mode
Figure 3:
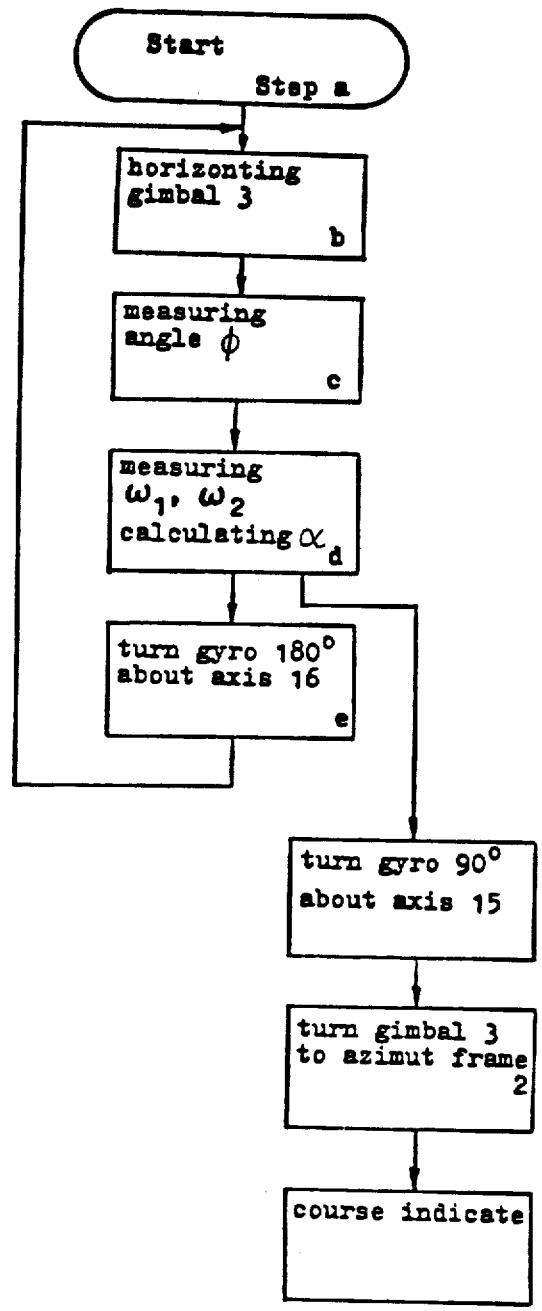
FIG. 3 is a flow diagram for a micro-processor for performing the north seeking and directional mode

The north seeking and the subsequent course holding operations are performed with the microprocessor in a previously determined sequence and include the following steps: (shown in FIG. 3)
  (a) switching on the gyro motor and closing the caging circuits of the gyro 13;
  (b) sensing the deviation of gimbal 3 from the horizontal in the direction perpendicular to the axis 15 by means of verticality sensor 8 and correcting it, if necessary, i.e. eliminating that deviation by actuating the moment generator 7;
  (c) measuring the inclination angle, $\phi$, of the precession axis 15 with respect to the horizontal with the aid of the position sensor 10;
  (d) measuring the output values of gyro 13, i.e. the tangential components of the earth's rate of rotation, in two mutually perpendicular components and calculating the associated north deviation angle $\alpha$ under consideration of the inclination of the precession axis 15;
  (e) possibly pivoting the gyro by 180° about the azimuth axis 16 by operation of the moment generator 6 and the azimuth sensor 5 and repeating steps (b) through (d). From the values thus obtained for the north deviation, the computer can now determine drift errors and a corrected north deviation angle;
  (f) pivoting the precession gimbal 3 clockwise, when viewed from the left, about the axis 15 from the position shown by 90° by operation of the moment generator 7, thus bringing vertically sensors 9 and 11 into operative position and bringing the spin axis 12 of the gyro into the horizontal position;

(g) possibly rotating the azimuth frame 2 by operation of the torque generator 6 into a position in which it is possible to transfer the north deviation angle $\alpha$ to the course value indicator without cardanic errors; this is the case when the precession gimbal 3 lies in the plane of the azimuth frame 2, which is sensed by the sensor 4. Stated in other terms, if axis 16 is inclined to the vertical, there exists one angular position of azimuth frame, or gimbal, 2 relative to frame 1 at which gimbal 3 lies in the plane of frame 2 and axis 12 is horizontal. The pivoting of the precession gimbal about 90° which is described in step (f) is shown in FIG. 2.

The gyro 13 is now in a course position which is decoupled from the vehicle and can indicate, by means of sensor 5, the momentary course of the vehicle.

During the north seeking procedure performed according to steps (a) through (e) above, it is also possible to simplify the computation of the north deviation angle by eliminating the angle $\phi$ in that the precession axis 15 is additionally aligned with the horizontal. For this purpose, the moment generator 6 is actuated under control of the output from pitch sensor 10 so that the precession axis is held in one of two possible horizontal positions. The pitch sensor 10 is here used as a verticality sensor.

The orientation of the precession gimbal 3 pursuant to step (f) above, is also necessary, in addition to the course determination, if the north determination is performed according to the gyrocompass method, for example for reasons of interfering moments. For this process the inclinometer 11 is additionally required to measure the deviation of the precession axis 19 of the gyro 13 or of the precession axis 15 of the gyro device from the horizontal.

If the precession gimbal 3 is in the vertical orientation, which is determined by the verticality sensor 9 and controlled by the moment generator 7, the moment generator 7 being actuated as shown, then the tangential component of the earth's rate of rotation produces a moment about the gyro axis 20. This moment, or the current generated by a moment directed oppositely thereto, constitutes a measure for the north deviation which can be used to adjust the gyro or to calculate the north deviation. This value is falsified by the inclination of the precession axis 15 with respect to the horizontal and is corrected by determining the inclination by means of the inclinometer 11 together with a correction calculation. The gyro component is preferably an dry tuned gyro its known from U.S. Pat. No. 3,354,726.

As said above the controls of the components of the gyro-devices and the calculations of the different values can be performed by a micro-processor, for example by the Micro-Processor MC 6809 of the US-Company Motorola Semiconductor Inc.

It will be understood that the above description of the present invention is susceptible to various modifications, changes and adaptations, and the same are intended to be comprehended within the meaning and range of equivalents of the appended claims.

What is claimed is:

1. In a gyro device arranged to be mounted in a vehicle and operable selectively as a directional gyro or as a gyro compass, which device includes:

a gyro component including a rotor rotatable about a spin axis;

a precession gimbal supporting the gyro rotor via its spin axis and pivotal about a precession axis;

first and second position sensors mounted for providing respective signals representing the inclination of the precession gimbal relative to the horizontal about each of two mutually perpendicular axes which are both perpendicular to the rotor spin axis, the first sensor providing an inclination representing signal relative to that one of the two axes which is parallel to the precession axis;

a second gimbal supporting the precession gimbal via its precession axis and pivotal about a pivot axis which is perpendicular to the precession axis;

a housing supporting the second gimbal via its associated pivot axis;

first drive means connected for pivoting the second gimbal about its pivot axis in response to signals from one of the position sensors, control means connected for calculating the north deviation angle of the device relative to a reference direction in response to signals generated by the gyro component; the improvement wherein:

said gyro component generates signals relative to two measuring directions;

said second gimbal is mounted with its pivot axis oriented substantially vertically;

said device further comprises second drive means connected to receive the signal from said first position sensor and for pivoting said precession gimbal about the precession axis into a position in which the gyro rotor spin axis is parallel to the pivot axis of said second gimbal;

the signal provided by said second position sensor is representative of the inclination of said precession axis to the horizontal; and said device further comprises switching means for effecting pivoting of said precession gimbal about the precession axis to bring the spin axis of said rotor into a horizontal orientation for permitting operation of said device as a directional gyro.

2. A device as defined in claim 1 wherein said control means are connected to process the signals generated by said gyro component and by said second position sensor for calculating the north deviation angle, $\alpha$, according to the equation $$\alpha = \alpha_1 + \arctan \frac{\omega_1 \cos\phi}{\omega_2 - \Omega_v \sin\phi}$$

where $\Omega_v$ is the vertical component of the earth's rate of rotation, $\alpha_1$ is the deviation of said second gimbal from the reference direction, $\omega_1$ and $\omega_2$ are the signals generated by said gyro component, and $\phi$ is the inclination angle of said precession axis to the horizontal.

3. A device as defined in claim 1 wherein, for gyrocompass operation, said first device means are connected to respond to the signals provided by said second position sensors for pivoting said second gimbal about its pivot axis into a position in which said precession axis is horizontal, and said control means then calculate the north deviation angle, $\alpha$, according to the equation $$\alpha = \alpha_1 + \arctan \frac{\omega_1}{\omega_2}$$

where $a_1$ is the deviation of said second gimbal from the reference direction, and $\omega_1$ and $\omega_2$ are the signals provided by said gyro component.

4. A device as defined in claim 1, 2 or 3 wherein, for the suppression of interfering moments, said first drive means are operative, after a first north deviation calculation, for pivoting said second gimbal about its pivot axis through an angle of 180°, and said control means are operative for then effecting a second north deviation calculation and subsequently effecting a corrected north deviation calculation on the basis of the first and second calculations.

5. A device as defined in claim 1 wherein said first drive means are further operative, after operation of said switching means to bring the spin axis of said rotor into a horizontal orientation, for pivoting said second gimbal about its pivot axis into a position where the cardanic error is zero for permitting transfer of the north deviation angle value to the directional gyro course indication.

6. A device as defined in claim 5 wherein said first drive means comprise a further sensor connected to sense the angular position of said precession gimbal about its precession axis relative to said second gimbal and to provide a signal for controlling the pivoting of said second gimbal into the position where the cardanic error is zero.

7. A device as defined in claim 1 wherein, for operation as a directional gyro, said switching means hold the spin axis of said gyro horizontally and further comprising a further position sensor mounted for providing a signal representing the angular deviation of said precession axis from the horizontal, and said control means are arranged to correct a north entering signal in response to the signal from said further position sensor.

* * * * *